(12) United States Patent
Kalandyk et al.

(10) Patent No.: US 11,868,907 B2
(45) Date of Patent: Jan. 9, 2024

(54) UPDATING CHATBOT WORKSPACES

(71) Applicant: International Business Machines Corporation, Armonk, NY (US)

(72) Inventors: Piotr Kalandyk, Zielonki (PL); Piotr P. Godowski, Cracow (PL); Pawel Tadeusz Januszek, Cracow (PL); Hubert Kompanowski, Izbica Kujawska (PL)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 17/207,880

(22) Filed: Mar. 22, 2021

(65) Prior Publication Data

US 2022/0300830 A1 Sep. 22, 2022

(51) Int. Cl.
  *G06N 5/022* (2023.01)
  *G06N 5/01* (2023.01)
  *G06F 40/205* (2020.01)
  *G06F 40/35* (2020.01)
  *G06F 40/30* (2020.01)
  *H04L 51/02* (2022.01)
  (Continued)

(52) U.S. Cl.
  CPC ............ *G06N 5/022* (2013.01); *G06F 40/14* (2020.01); *G06F 40/205* (2020.01); *G06F 40/30* (2020.01); *G06F 40/35* (2020.01); *G06N 5/01* (2023.01); *H04L 51/02* (2013.01); *G06F 9/45529* (2013.01)

(58) Field of Classification Search
None
See application file for complete search history.

(56) References Cited

U.S. PATENT DOCUMENTS

| | | | |
|---|---|---|---|
| 11,157,475 B1 * | 10/2021 | Cobb | G06F 18/2431 |
| 2014/0122083 A1 * | 5/2014 | Xiaojiang | H04L 51/02 704/270.1 |
| 2014/0122619 A1 | 5/2014 | Duan | |

(Continued)

OTHER PUBLICATIONS

Ahmed Azraq, Hala Aziz, Nicolas Nappe, Cesar Rodriguez Bravo, Lak Sri; Building Cognitive Applications with IBM Watson Services, vol. 2, May 2017; URL :https://www.redbooks.ibm.com/redbooks/pdfs/sg248394.pdf (Year: 2017).*

(Continued)

*Primary Examiner* — Richa Sonifrank
(74) *Attorney, Agent, or Firm* — Joseph P. Curcuru (57) ABSTRACT

In an approach to improve chatbot workspaces by updating chatbot workspaces through documentation updating and chatbot skill updating. Embodiments determine a chatbot knowledge base contains a set of updated information and updates a chatbot dialog decision tree based on one or more identified new topics in a set of updated information using natural language processing techniques to determine a set of intents, a set of entities, and a set of keywords. Further, embodiments identify a starting decision for traversing the chatbot dialogue decision tree based on the updated set of entities and the updated set of keywords. Additionally, embodiments interact, via a user interface, with an end user according to one or more interactions traversing the chatbot dialogue decision tree for a response.

20 Claims, 4 Drawing Sheets

(51) Int. Cl.
*G06F 9/455* (2018.01)
*G06F 40/14* (2020.01)

(56) References Cited

U.S. PATENT DOCUMENTS

| | | | |
|---|---|---|---|
| 2018/0300310 A1 | 10/2018 | Shinn | |
| 2019/0087707 A1* | 3/2019 | Cummins | G06F 16/3329 |
| 2019/0124020 A1* | 4/2019 | Bobbarjung | H04L 51/02 |
| 2019/0294728 A1* | 9/2019 | Kohlmeier | G06F 16/93 |
| 2019/0377824 A1 | 12/2019 | Wang | |
| 2020/0394363 A1* | 12/2020 | Galitsky | G06F 16/00 |
| 2022/0019640 A1* | 1/2022 | Hermann | G06F 40/197 |
| 2022/0237567 A1* | 7/2022 | Tiwari | G06Q 10/1053 |

OTHER PUBLICATIONS

Disclosed Anonymously, "Contextual Recommendations for Dialog Workspace", ip.com, https://ip.com/IPCOM/000263833, Oct. 9, 2020, 5 pages.

Lai et al., "Method and System for Determining Intent of a User Query", ip.com, https://priorart.ip.com/IPCOM/000204187, Feb. 17, 2011, 6 pages.

Liu et al., "Dynamic Updating of the Knowledge Base for a Large-Scale Question Answering System", ACM Trans. Asian Low-Resour. Lang. Inf. Process. 19, 3, Article 45 (Feb. 2020), <https://dl.acm.org/doi/10.1145/3377708>, 13 pages.

Loeser, Henrik, "Watson Conversation: How to Manage Workspaces", IBM, <https://www.ibm.com/cloud/blog/watson-conversation-manage-workspaces>, Apr. 4, 2017, 6 pages.

* cited by examiner

UPDATING CHATBOT WORKSPACES

BACKGROUND OF THE INVENTION

The present invention relates generally to the field of artificial intelligence, and more particularly to chatbot workspace updates.

A chatbot is a software application used to conduct an on-line chat conversation via text or text-to-speech, in lieu of providing direct contact with a live human agent. Chatbots are designed to convincingly simulate the way a human would behave as a conversational partner. Chatbot systems typically require continuous tuning and testing, and many in production remain unable to adequately converse or pass the industry standard Turing test. Chatbots are used in dialog systems for various purposes including customer service, request routing, or information gathering. While some chatbot applications use extensive word-classification processes, natural language processors, and sophisticated artificial intelligence (AI), other chatbot applications simply scan for general keywords and generate responses using common phrases obtained from an associated library or database. Most chatbots are accessed on-line via website popups or through virtual assistants. These chatbots can be classified into usage categories that include: commerce (e-commerce via chat), education, entertainment, finance, health, news, and productivity.

SUMMARY

Embodiments of the present invention disclose a method, a computer program product, and a system for updating chatbot workspaces the computer-implemented method for updating chatbot workspaces, the computer-implemented method comprising: determining a chatbot knowledge base contains a set of updated information; updating a chatbot dialog decision tree based on one or more identified new topics in a set of updated information, wherein updating the chatbot dialogue decision tree comprises using natural language processing techniques to determine a set of intents, a set of entities, and a set of keywords; identifying a starting decision for traversing the chatbot dialogue decision tree based on the updated set of entities and the updated set of keywords; and interacting, via a user interface, with an end user according to one or more interactions traversing the chatbot dialogue decision tree for a response.

DETAILED DESCRIPTION

Chatbot technology is an emerging field in AI, which enables conversation and knowledge delivery to an end user. Chatbots leverage structured and unstructured data stores using machine learning techniques for searching and identifying answers for user questions. Generally, embodiments of the present invention recognize that current chatbot technology leverages manually created knowledge by chatbot developers known as Manual Workspace and already existing documentation for global searches. The Manual Workspace enables close conversation between chatbots and end users, which is the preferred way of finding answers for end users' questions. However, embodiments of the present invention recognize that the Manual Workspace requires chatbot developers to code in the existing knowledge into chatbot workspace.

Embodiments of the present invention improve the art and solve the problem stated above by adding chatbot metadata to a documentation source to generate a chatbot workspace at the end of each documentation development cycle. Embodiments of the present invention enable the chatbot to leverage specific information that was added to the documentation by information developers to enable chatbot generation. By enabling the chatbot to leverage specific information from added to the documentation embodiments of the present invention enable the chatbot workspace to stay current and in sync with the main knowledge store (e.g., database). Embodiments of the present invention create automated scripts that automatically re-create the chatbot workspace at the end of documentation update cycle production.

Implementation of embodiments of the invention may take a variety of forms, and exemplary implementation details are discussed subsequently with reference to the Figures (i.e., FIG. 1-FIG. 4).

Figure 1:
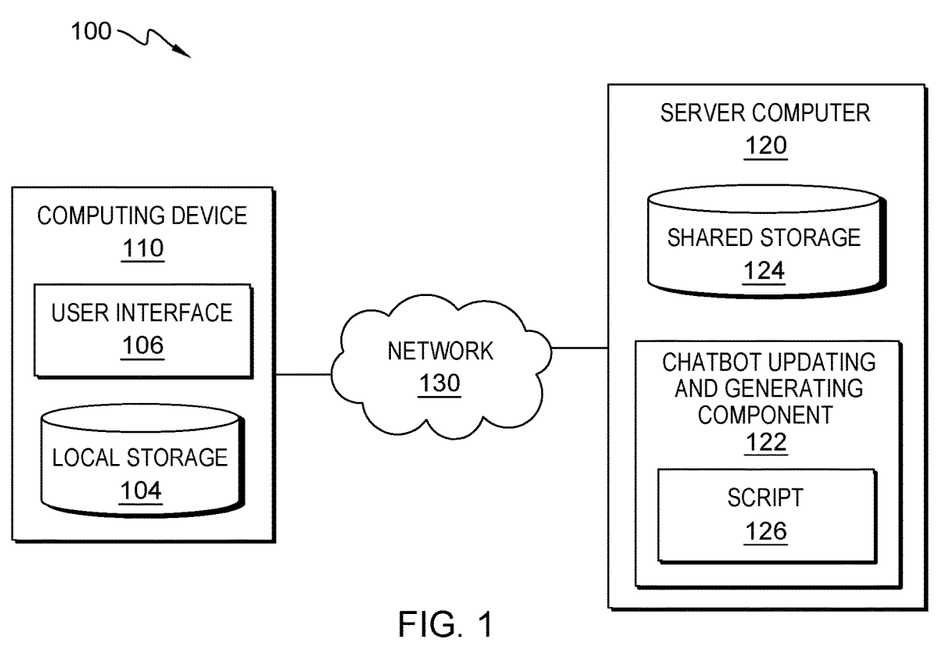
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to chatbot updating and skill generation component (component) 122. Computing device 110, via user interface 106, may enable a user and/or a client to interact with one or more generated chatbots, component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. Interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4. In some embodiments server computer 120 may represent a plurality of server computers.

Each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 and target database 128 reside on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with computing device 110, and/or server computer 120, via network 130.

In the depicted embodiment, component 122 comprises script 126, wherein script 126 executes on or through component 122. In other embodiments, script 126 may be executed on computing device 110. In various embodiments of the present invention, not depicted in FIG. 1, script 126 may execute on a plurality of server computers 120 and/or on a plurality of computing devices 110. In some embodiments, script 126 may be located and/or executed anywhere within distributed data processing environment 100 as long as script 126 is connected to and/or communicates with computing device 110, and/or server computer 120, via network 130.

In various embodiments of the present invention, component 122 adds the chatbot metadata to the documentation source, wherein the chatbot metadata is consumable by an automation script (e.g., script 126). In various embodiments of the present invention, script 126 is one or more automated scripts (e.g., command tools) as it is known and understood in the art. In various embodiments of the present invention, script 126 is responsible for parsing and identifying input data and identifying new content/data. New content or data may be data that was recently input by a developer and/or data that was entered by a developer that has not been stored in shared storage 124 and/or local storage 104. Component 122 may receive and/or retrieve the new content/data. In various embodiment of the present invention, component 122 generates one or more chatbot skills from the identified new data in a document source. The document source is typically used for product's documentation creation in the form of portable document format (pdf) files or world wide web (WWW) sites. In various embodiments of the present invention, component 122, via script 126, searches the document source to identify metadata (i.e., chatbot metadata) designated for chatbot use. Chatbot metadata comprises but is not limited to: intent represented as documentation's chapter name, intent examples/keywords build from the page's description, entities created from the chapter's specific words, used for question decomposition in chatbot conversation, and/or logical condition build from entities which enable chatbot reaches the specific documentation link.

In various embodiments of the present invention, component 122, based on new data identified by script 126, updates the correspondent chatbot skills using the chatbot workspace application program interface (API) based on the documentation pages from the chatbot metadata. In various embodiments of the present invention, component 122 creates an automation script (e.g., script 126) to identify input data, wherein component 122 synchronizes chatbot skills, based on the identified input data by script 126, with the knowledge center product's documentation stored on shared storage 124. Script 126 may search hypertext markup language (HTML) documentation for new topics with chatbot specific data using HTML tags and documentation structure. In various embodiments of the present invention, for new pages/connect found component 122 updates the corresponding chatbot skills using an API. In various embodiments of the present invention, component 122 creates new intents directly from the new pages the specific keywords and/or examples within the new pages. In various embodiments of the present invention, component 122 creates new entities and skill dialogs that represent the new HTML pages in the chatbot dialog trees.

In various embodiments of the present invention, component 122 receives new functionality and creates knowledge in the documentation source based on the received new functionality. In various embodiments of the present invention, component 122 reviews the knowledge in the documentation chapters and identifies new intent and new entities within the documentation. In various embodiments of the present invention, component 122 reviews a predetermined number of pages in the documentation source or documentation chapter and creates intents' examples for the reviewed predetermined number of pages. In various embodiments of the present invention, component 122 receives logical conditions and entities from an information developer and implements the received logical conditions and entities ensuring the documentation pages comprise unique conditions. In various embodiments of the present invention, component 122 marks the documentation as ready to initiate the chatbot generation process and documentation publication start, wherein the new documentation and chatbot skill are marked as "ready."

Figure 2:
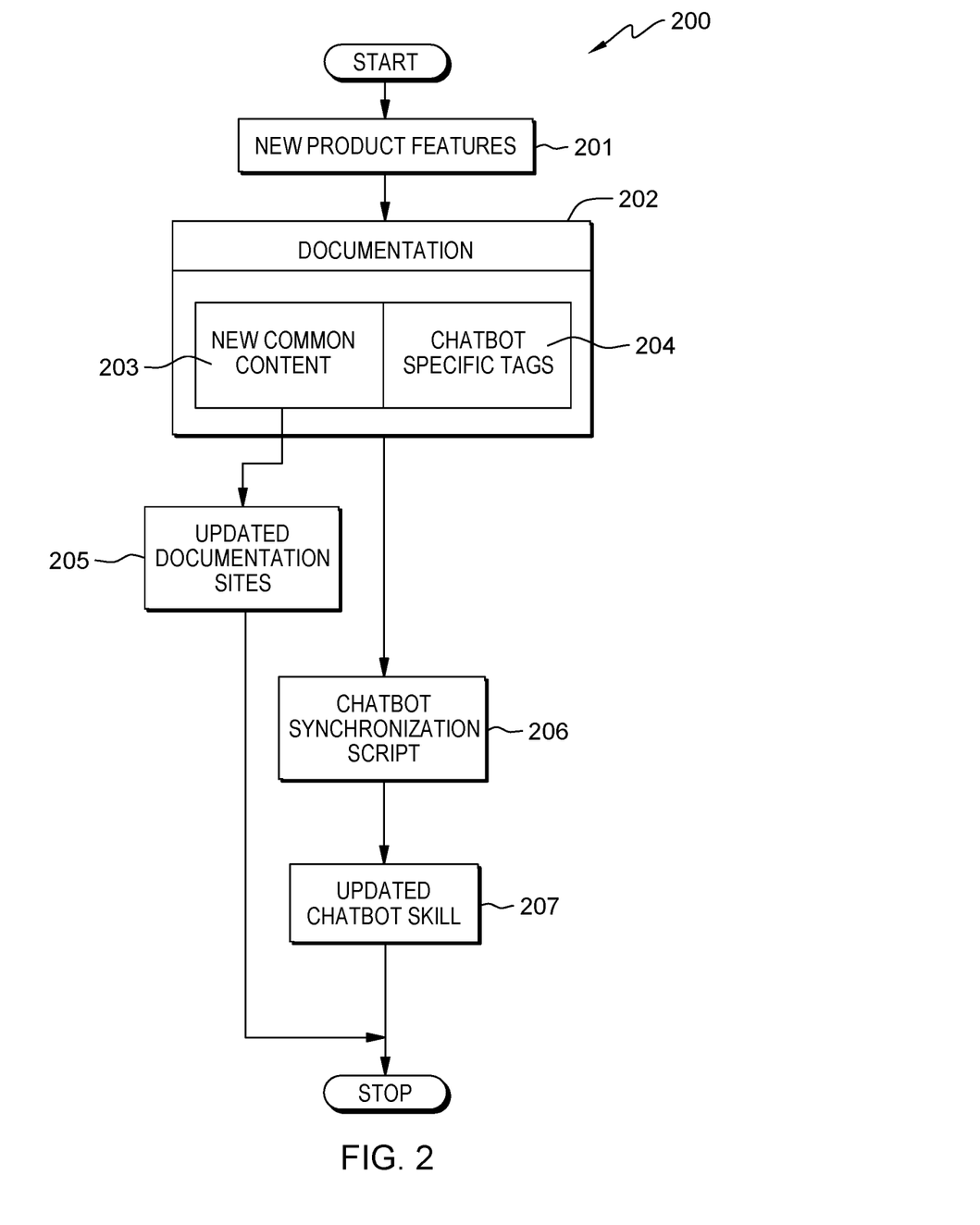
FIG. 2 illustrates operational steps of a chatbot updating and skill generation component, on a server computer within the distributed data processing environment of FIG. 1, for updating chatbot workspaces, in accordance with an embodiment of the present invention.

FIG. 2 illustrates operational steps of component 122, generally designated 200, in communication with computing device 110, within distributed data processing environment 100 of FIG. 1, for automation of chatbot workspace update through documentation updating and chatbot skill generation, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims In the depicted embodiment new product features 201 are received by documentation 202. In various embodiments of the present invention, component 122, via script 126, parses new product features 201 within documentation 202, wherein component 122 tags newly identified chatbot skills from the parsed data. In various embodiments of the present invention, component 122 may receive and or retrieve data from new product features 201 that have been tagged as new skill. In various embodiments of the present invention, component 122 may display a prompt outlining the one or more identified, retrieved, and/or received tagged new skills to a user, via interface 106, wherein the displayed prompt is responses. For example, displaying a prompt listing identified tagged new skills and prompting the user to review and confirm the displayed list comprises new chatbot skills. New product features 201 may be prepared by feature development along with chatbot metadata sot that component 122 may read new product features 201 and/or the chatbot metadata and automatically extend documentation 202 two new common content 203 and chatbot specific tags 204.

For example, embodiments of the present invention assume a development team has to prepare the following data beforehand: (i) feature topic name and specify interest area name where the topic belongs (e.g. docker deployment in Installation) so metadata will comprise: chatbot intent results in installation; (ii) a question for learned chatbot specifically associated with the feature, (e.g. "How to deploy docker on an operating system?") so metadata will comprise: chatbot_question is "How to deploy docker on operating system?"; and (iii) additional information needed for building conversation so metadata will comprise chatbot_condition is "@OS:Linux AND @deployment_type:docker." In various embodiments of the present invention, a link to a new page with the feature description is generated by script 126 displayed on updated documentation sites 205. The link will be available and provided, via script 126, for chatbot synchronization script 206. In various embodiments of the present invention, the link will be provided as an answer to a user's question in a chatbot conversation associated with the new feature.

In the depicted embodiment, component 122 receives new common content 203 and chatbot specific tags 204 from a manual input. In various embodiments of the present invention, component 122, via script 126, parses, reviews, and identifies new topics in the received new common content 203 and chatbot specific tags 204. New common content 203 is common content in relation to documentation as it is known and understood in the art. In the depicted embodiment, component 122 updates the documentation site (e.g., updated documentation sites 205) based on the new topics identified in the received new common content 203 and chatbot specific tags 204. Additionally, in the depicted embodiment, component 122 executes chatbot synchronization script 206, wherein chatbot synchronization script 206 comprises component 122 creating an automation script (e.g., script 126), wherein script 126 synchronizes chatbot skills with the knowledge center product's documentation stored on shared storage 124. Script 126 may search HTML documentation for new topics with chatbot specific data, from chatbot specific tags 204, using HTML tags and documentation structure. In various embodiments of the present invention, chatbot synchronization script 206 generates chatbot skills by reading new feature from chatbot specific tags 204 and updates/creates chatbot workspace in updated chatbot skill(s) 207 using a workspace API. For example, creating chatbot intents from chatbot intent metadata (e.g., Installation), creating chatbot intent's questions from chatbot_question metadata, creating chatbot entities with new values from chatbot_condition, parsing condition and extract @entity_name:value, and creating chatbot_conversation dialog with main intent node and sub-notes using chatbot_condition metadata and URL from updated documentation sites 205. Further, chatbot synchronization script 206 may generate chatbot skills by starting chatbot learning process using the workspace API, generating regression test input from pairs (e.g., chatbot_question, expected URL to documentation page with the new feature), and performing tests using regression data from the previous step.

In various embodiments of the present invention, component 122, via script 126, updates chatbot skills 207. In various embodiments of the present invention, for new pages/connect found component 122, via script 126, will update the corresponding chatbot skills using an API at update chatbot skills 207. In various embodiments of the present invention, component 122 creates new intents directly from the new pages the specific keywords and/or examples within the new pages. In various embodiments of the present invention, component 122 creates new entities and skill dialogs that represent the new HTML pages in the chatbot dialog trees. In various embodiments of the present invention, component 122 generate a chatbot, wherein the chatbot comprise the new entities and skill dialogs.

Figure 3:
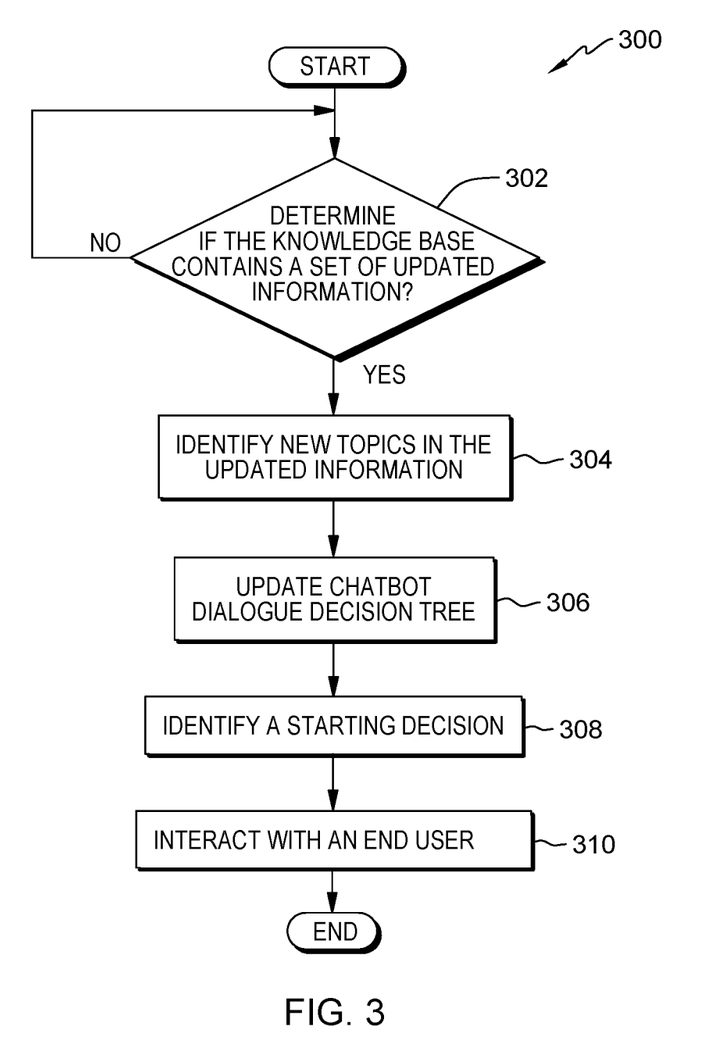
FIG. 3 illustrates operational steps of the chatbot updating and skill generation component, on a server computer within the distributed data processing environment of FIG. 1, for automation of updating chatbot workspace and chatbot skill generation, in accordance with an embodiment of the present invention.

FIG. 3 illustrates operational steps of component 122, generally designated 300, in communication with computing device 110, within distributed data processing environment 100 of FIG. 1, for automation of chatbot workspace update through documentation updating and chatbot skill generation, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 determines if the knowledge base contains a set of updated information. In various embodiments of the present invention, component 122 determines if the knowledge base contains a set of updated information (e.g., new input data). In the depicted embodiment if component 122 determines the knowledge base does not contain a set of updated information (No step) then component 122 loops until it does identify a set of updated information in the knowledge base. Additionally, in the depicted embodiment, if component 122 determines the knowledge base does contain a set of updated information (Yes step) then component 122 advances to step 304.

In step 304, component 122 identifies new topics in the updated information. In various embodiments of the present invention, component 122 parses and searches the set of updated information to identify sets of new topics. In various embodiments of the present invention, component 122 searches the set of updated information to identify sets of new topics, wherein the searching is performed according to a set of chatbot specific HTML tags to distinguish the set of new topics form known topics.

In step 306, component 122 updates the chatbot dialogue decision tree. In various embodiments of the present invention, component 122 updates the chatbot dialogue decision tree based on the identified set of new topics. In various embodiments of the present invention, component 122 updates the chatbot dialogue decision tree based on the identified set of new topics, wherein updating the chatbot dialog decision tree comprises using natural language processing (NLP) techniques to determine a set of intents, a set of entities, and a set of keywords. In some embodiments of the present invention, updating the chatbot dialog decision tree further comprises modifying the chatbot dialogue decision tree such that each intent of the set of intents creates a new decision within the chatbot dialogue decision tree.

In step 308, component 122 identifies a starting decision. In various embodiments of the present invention, component 122 identifies a starting decision for traversing the chatbot dialogue decision tree based on the set of entities and the set of keywords determined in step 306.

In step 310, component 122 interacts with an end user. In various embodiments of the present invention, component 122 generates a chatbot and executes the identified starting decision for traversing the chatbot dialogue decision tree based on the set of entities and the set of keywords determined in step 306, wherein the execution of the identified starting decision comprises interacting with an end user and based on the interactions traversing the chatbot dialogue tree for a response. In various embodiment of the present invention, component 122 the generated chatbot comprises the updated information from steps 304-308.

Figure 4:
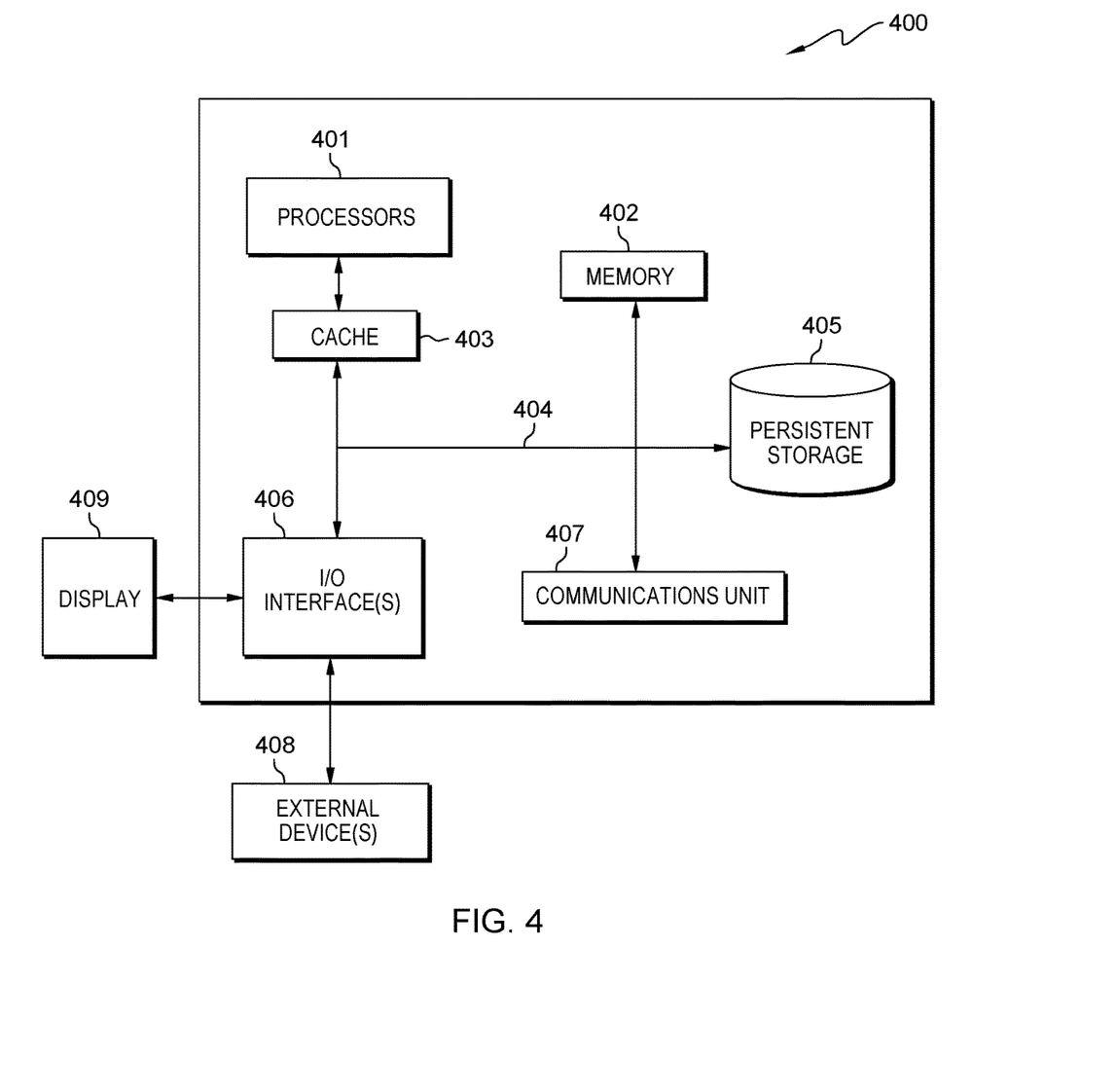
FIG. 4 depicts a block diagram of components of the server computer executing the data synchronization component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing device 120 represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data pro-

What is claimed is:

1. A computer-implemented method for updating chatbot workspaces, the computer-implemented method comprising:

determining a chatbot knowledge base contains a set of updated information;

adding chatbot metadata from the set of updated information to a documentation source, wherein the chatbot metadata is consumable by an automation script;

responsive to identifying new data in the documentation source, generating one or more chatbot skills from the identified new data in the document source;

updating a chatbot dialog decision tree based on the one or more identified new topics in the set of updated information, wherein updating the chatbot dialogue decision tree comprises using natural language processing techniques to determine a set of intents, a set of entities, and a set of keywords;

responsive to identifying new data by a script, updating the one or more correspondent chatbot skills using a chatbot workspace application program interface (API) based on the documentation pages from the chatbot metadata;

creating the automation script to identify input data;

synchronizing, by the automation script, the chatbot skills by utilizing a knowledge center product's documentation stored on a database;

searching, by the automation script, hypertext markup language (HTML) documentation for new topics with chatbot specific data using HTML tags and documentation structure;

responsive to identifying new pages, updating, by the API, the chatbot skills;

creating new entities and skill dialogs that represent HTML pages in the chatbot dialog decision trees; and identifying a starting decision for traversing the chatbot dialogue decision tree based on the updated set of entities and the updated set of keywords, wherein the execution of the identified starting decision comprises interacting with an end user and based on the interactions traversing the chatbot dialogue tree for a response.

2. The method of claim 1, further comprising:

searching the set of updated information to identify a set of new topics.

3. The method of claim 2, wherein the searching is performed according to a set of chatbot specific HTML tags, wherein the HTML tags are used to distinguish the set of new topics from known topics.

4. The method of claim 1, wherein updating the chatbot dialogue decision tree further comprises:

modifying the chatbot dialogue decision tree, wherein each intent of the set of intents respectively creates a new decision within the chatbot dialogue decision tree.

5. The method of claim 1, further comprising:

parsing, by a script, one or more new product features within a documentation page; and tagging newly identified chatbot skills based on the new product features within the documentation page.

6. The method of claim 1, further comprising:

executing a chatbot synchronization script.

7. The method of claim 1, further comprising:

generating, by a script, a link to a new page comprising one or more feature descriptions of the topics and identified new chatbot skills;

displaying the generated link on an updated documentation site, wherein the link is available and provided for a chatbot synchronization script and, wherein the link is provided as an answer to a question of the end user in a chatbot conversation associated with one or more new feature descriptions.

8. A computer program product for automation of chatbot workspace update, the computer program product comprising:
one or more computer readable storage devices and program instructions stored on the one or more computer readable storage devices, the stored program instructions comprising:
program instructions to determine a chatbot knowledgebase contains a set of updated information;
program instructions to add chatbot metadata from the set of updated information to a documentation source, wherein the chatbot metadata is consumable by an automation script;
responsive to identifying new data in the documentation source, program instructions generate one or more chatbot skills from the identified new data in the document source;
program instructions to update a chatbot dialog decision tree based on one or more identified new topics in the set of updated information, wherein updating the chatbot dialogue decision tree comprises using natural language processing techniques to determine a set of intents, a set of entities, and a set of keywords;
responsive to identifying new data by a script, program instructions to update one or more correspondent chatbot skills using a chatbot workspace application program interface (API) based on the documentation pages from the chatbot metadata;
program instructions to create the automation script to identify input data;
program instructions to synchronize, by the automation script, the chatbot skills by utilizing a knowledge center product's documentation stored on a database;
program instructions to search, by the automation script, hypertext markup language (HTML) documentation for new topics with chatbot specific data using HTML tags and documentation structure;
responsive to identifying new pages, program instructions to update, by the API, the chatbot skills;
program instructions to create new entities and skill dialogs that represent HTML pages in the chatbot dialog decision trees; and
program instructions to identify a starting decision for traversing the chatbot dialogue decision tree based on the updated set of entities and the updated set of keywords, wherein the execution of the identified starting decision comprises interacting with an end user and based on the interactions traversing the chatbot dialogue tree for a response.

9. The computer program product of claim 8, further comprising:
program instructions to search the set of updated information to identify a set of new topics.

10. The computer program product of claim 9, wherein the searching is performed according to a set of chatbot specific HTML tags, wherein the HTML tags are used to distinguish the set of new topics from known topics.

11. The computer program product of claim 8, wherein updating the chatbot dialogue decision tree further comprises:
program instructions to modify the chatbot dialogue decision tree, wherein each intent of the set of intents respectively creates a new decision within the chatbot dialogue decision tree.

12. The computer program product of claim 8, further comprising:
program instructions to parse by a script, one or more new product features within a documentation page; and
program instructions to tag newly identified chatbot skills based on the new product features within the documentation page.

13. The computer program product of claim 8, further comprising:
program instructions to execute a chatbot synchronization script.

14. The computer program product of claim 8, further comprising:
program instructions to generate, by a script, a link to a new page comprising one or more feature descriptions of the topics and identified new chatbot skills;
program instructions to display the generated link on an updated documentation site, wherein the link is available and provided for a chatbot synchronization script and, wherein the link is provided as an answer to a question of the end user in a chatbot conversation associated with one or more new feature descriptions.

15. A computer system for automation of chatbot workspace update, the computer system comprising:
one or more computer processors;
one or more computer readable storage devices;
program instructions stored on the one or more computer readable storage devices for execution by at least one of the one or more computer processors, the stored program instructions comprising:
program instructions to determine a chatbot knowledgebase contains a set of updated information;
program instructions to add chatbot metadata from the set of updated information to a documentation source, wherein the chatbot metadata is consumable by an automation script;
responsive to identifying new data in the documentation source, program instructions generate one or more chatbot skills from the identified new data in the document source;
program instructions to update a chatbot dialog decision tree based on one or more identified new topics in the set of updated information, wherein updating the chatbot dialogue decision tree comprises using natural language processing techniques to determine a set of intents, a set of entities, and a set of keywords;
responsive to identifying new data by a script, program instructions to update one or more correspondent chatbot skills using a chatbot workspace application program interface (API) based on the documentation pages from the chatbot metadata;
program instructions to create the automation script to identify input data;
program instructions to synchronize, by the automation script, the chatbot skills by utilizing a knowledge center product's documentation stored on a database;
program instructions to search, by the automation script, hypertext markup language (HTML) documentation for new topics with chatbot specific data using HTML tags and documentation structure;
responsive to identifying new pages, program instructions to update, by the API, the chatbot skills;
program instructions to create new entities and skill dialogs that represent HTML pages in the chatbot dialog decision trees; and program instructions to identify a starting decision for traversing the chatbot dialogue decision tree based on the updated set of entities and the updated set of keywords, wherein the execution of the identified starting decision comprises interacting with an end user and based on the interactions traversing the chatbot dialogue tree for a response.

16. The computer system of claim 15, further comprising:

program instructions to search the set of updated information to identify a set of new topics, wherein the searching is performed according to a set of chatbot specific HTML tags, wherein the HTML tags are used to distinguish the set of new topics from known topics.

17. The computer system of claim 15, wherein updating the chatbot dialogue decision tree further comprises:

program instructions to modify the chatbot dialogue decision tree, wherein each intent of the set of intents respectively creates a new decision within the chatbot dialogue decision tree.

18. The computer system of claim 15, further comprising:

program instructions to parse by a script, one or more new product features within a documentation page; and program instructions to tag newly identified chatbot skills based on the new product features within the documentation page.

19. The computer system of claim 15, further comprising:

program instructions to execute a chatbot synchronization script.

20. The computer system of claim 15, further comprising:

program instructions to generate, by a script, a link to a new page comprising one or more feature descriptions of the topics and identified new chatbot skills; and program instructions to display the generated link on an updated documentation site, wherein the link is available and provided for a chatbot synchronization script and, wherein the link is provided as an answer to a question of the end user in a chatbot conversation associated with the one or more new feature descriptions.

\* \* \* \* \*